United States Patent
Cassidy et al.

(10) Patent No.: US 6,195,573 B1
(45) Date of Patent: *Feb. 27, 2001

(54) RADIO TELEPHONE RECEIVER WITH QUICK QUIESCENT MODE

(75) Inventors: Brian Charles Cassidy, Camberley; Barry George Cardiff, Farnham, both of (GB)

(73) Assignee: Nokia Mobile Phones Limited, Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/772,075

(22) Filed: Dec. 19, 1996

(30) Foreign Application Priority Data

Dec. 22, 1995 (GB) .................................. 9526459

(51) Int. Cl.⁷ .............................. H04Q 7/20; H04B 7/26
(52) U.S. Cl. ...................... 455/574; 455/38.3; 455/343
(58) Field of Search ................................ 455/403, 572, 455/574, 38.3, 343; 370/311

(56) References Cited

U.S. PATENT DOCUMENTS

| | | | |
|---|---|---|---|
| 5,241,284 | 8/1993 | Nyqvist et al. | 330/297 |
| 5,265,270 * | 11/1993 | Stengel et al. | 455/38.3 |
| 5,291,542 | 3/1994 | Kivari et al. | 379/58 |
| 5,378,935 | 1/1995 | Korhonen et al. | 327/114 |
| 5,384,564 | 1/1995 | Wycoff et al. | 340/825.44 |
| 5,416,435 | 5/1995 | Jokinen et al. | 327/113 |
| 5,471,655 | 11/1995 | Kivari | 455/127 |
| 5,491,718 | 2/1996 | Gould et al. | 375/205 |
| 5,570,369 * | 10/1996 | Jokinen | 455/38.3 |
| 5,581,244 * | 12/1996 | Jokimies et al. | 455/38.3 |
| 5,722,046 * | 2/1998 | Serfaty et al. | 455/38.3 |

FOREIGN PATENT DOCUMENTS 0 473 465 3/1992 (EP) .
2 290 399 12/1995 (GB) .

OTHER PUBLICATIONS

WPI Abstract Accession No. 95–115940/16, JP 7038488, JP 7038493 (Matsushita).

* cited by examiner

Primary Examiner—Dwayne D. Bost
Assistant Examiner—Nay Maung
(74) Attorney, Agent, or Firm—Perman & Green, LLP

(57) ABSTRACT

A receiver for a radio telephone is disclosed comprising receiving means for receiving signal comprising multi-stage encoded information. The receiver further comprises means for recognizing information from the multi-stage encoded information or first stage decoded information, and control means for enabling a quiescent mode for the receiver in accordance with a recognition result.

20 Claims, 5 Drawing Sheets

B = BCCH (BROADCAST MESSAGE)    Ab, As1, Ap, As2, Np are.
P = PCH  (PAGING CHANNEL)
S = SCCH (SIGNALLING CONTROL CHANNEL)    BS PARAMETERS

* MOBILES DIVIDED INTO Np GROUPS -MS ONLY COMES ALIVE FOR ONE 'P' PER SUPERFRAME

| | | | | | | | | |
|---|---|---|---|---|---|---|---|---|
| LAYER 1 HEADER | 1 | X | X | X | X | X | X | X |
| LAYER 2 ADDRESS | 0 | 0 | 0 | 1 | 0 | 0 | 0 | 1 |
| MSI | 1 | 1 | 1 | 1 | 1 | 1 | 1 | 1 |
| UI | 0 | 0 | 0 | 0 | 0 | 0 | 1 | 1 |
| PLATFORM INDICATION | X | X | X | X | X | 1 | 0 | 0 |
| MESSAGE ID | 0 | 0 | 0 | 0 | 0 | 0 | 1 | 0 |
| BCCH RX PERIOD | X | X | X | X | X | X | X | X |
| NUMBER OF PAGED MS | X | X | X | X | X | X | X | X |
| MSI | X | X | X | X | X | X | X | X |
| | X | X | X | X | X | X | X | X |
| ID NUMBER | X | X | X | X | X | X | X | X |

Fig.4.

| | | | | | | | | | | | | | | |
|---|---|---|---|---|---|---|---|---|---|---|---|---|---|---|
| 1 | Ø | 1 | 1 | Ø | X | X | X | X | X | X | X | X | X | X |
| X | 1 | 1 | 1 | Ø | X | X | X | X | X | X | X | X | X | X |
| X | Ø | 1 | X | Ø | X | X | X | X | X | X | X | X | X | X |
| X | Ø | 1 | X | Ø | X | X | X | X | X | X | X | X | X | X |
| X | Ø | Ø | X | Ø | X | X | X | X | X | X | X | X | X | X |
| X | 1 | Ø | X | Ø | X | X | X | X | X | X | X | X | X | X |
| X | 1 | Ø | X | 1 | X | X | X | X | X | X | X | X | X | X |
| X | 1 | Ø | 1 | Ø | X | X | X | X | X | X | X | X | X | X |
| Ø | 1 | Ø | Ø | X | X | X | X | X | X | X | X | X | X | X |
| Ø | 1 | Ø | Ø | X | X | X | X | X | X | X | X | X | X | X |
| X | X | X | X | X | X | X | X | X | X | X | X | X | X | X |
| X | X | X | X | X | X | X | X | X | X | X | X | X | X | X |
| X | X | X | X | X | X | X | X | X | X | X | X | X | X | X |
| X | X | X | X | X | X | X | X | X | X | X | X | X | X | X |

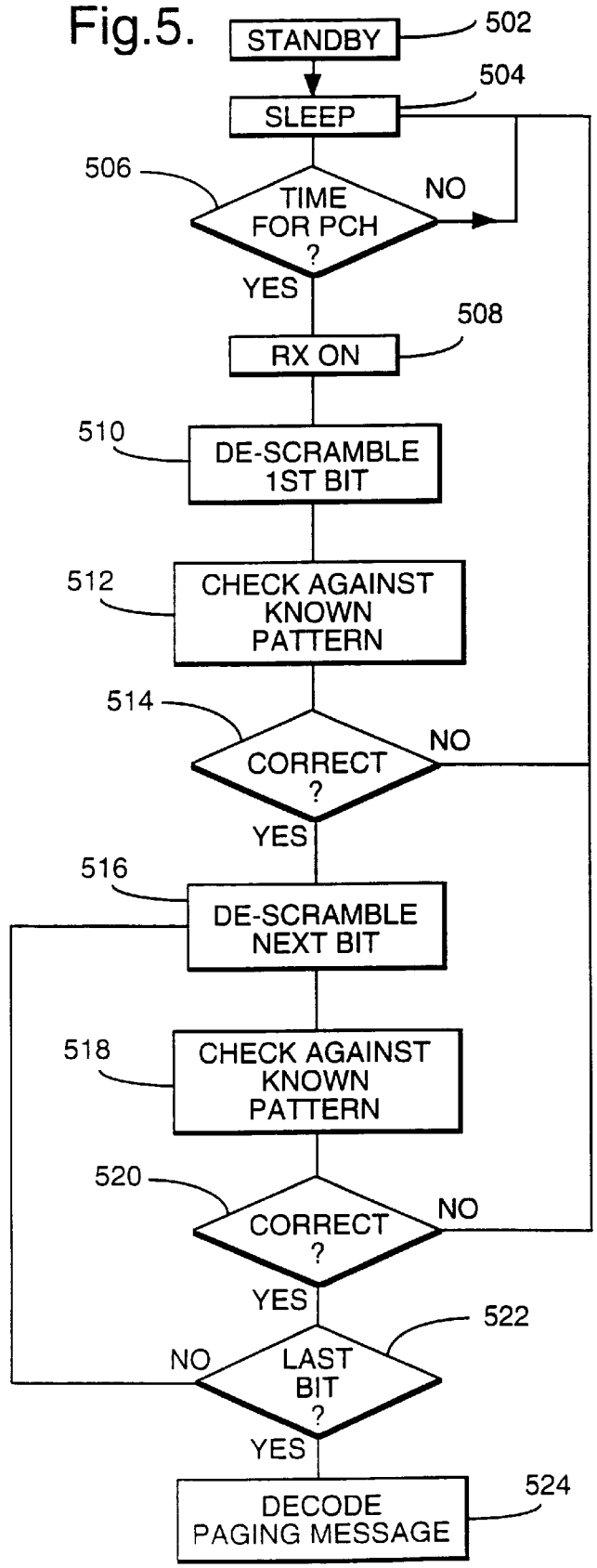

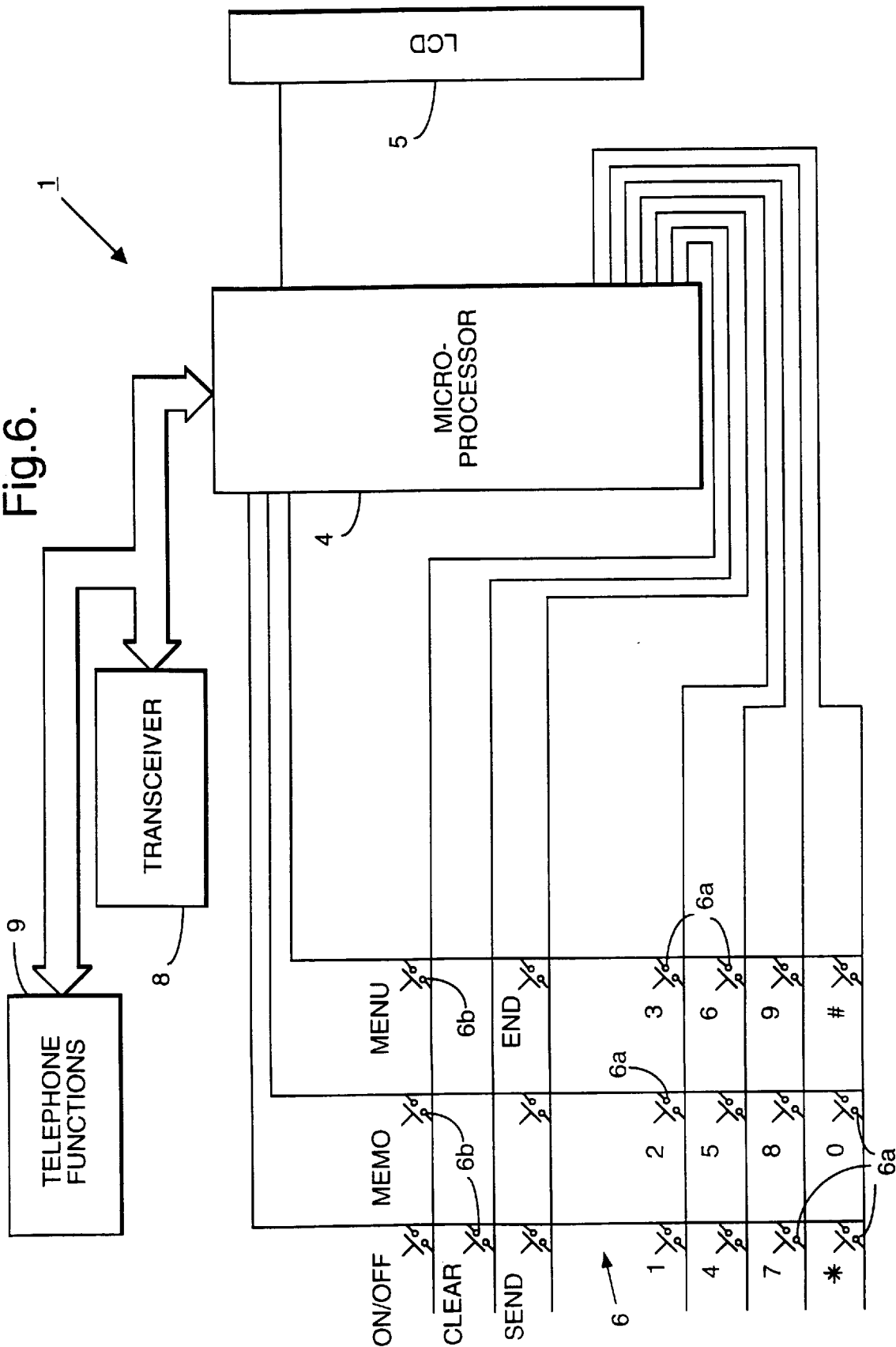

RADIO TELEPHONE RECEIVER WITH QUICK QUIESCENT MODE

FIELD OF THE INVENTION

The present invention relates to a receiver, and method for operation thereof, for a radio telephone.

BACKGROUND TO THE INVENTION

Radio telephones, in particular battery powered hand portable telephones, have been designed to be smaller and more lightweight than ever before. This is due to user requirements for small, lightweight mobile terminals. However, users also require longer periods of use of the mobile terminals before the battery requires replacing or recharging. This requirement is in conflict with the requirement that mobile terminals are small and lightweight, since a battery's current capacity is proportional to its weight and/or volume. Thus, in order to increase the time period of operation of a mobile terminal between recharging or replacing of a battery, effort has been made to reduce the power consumption of the mobile terminal, as well as attempting to increase the power to weight (volume) ratio of the batteries for the mobile terminal.

For a mobile terminal there are two distinct modes of operation, each characterized by different power consumption levels. In the first mode, known as an "in call" mode, power consumption is high since the mobile will be periodically transmitting up to 0.8 watts of power for a Class III PDC hand portable for example. The second mode is the "standby" mode. In this mode the mobile terminal operates on a low current consumption for internal housekeeping of the mobile terminal such as a clock, only periodically "waking up" to receive information signals such as paging information from a base station of the radio telephone network. Even when receiving signals the power consumption of the mobile terminal is much lower than when it is transmitting.

Typically, a user of a mobile telephone does not make many calls, and if they do they accept high power consumption. However, users are concerned with the length of standby time, and this is an important marketing feature of a mobile terminal.

FIG. 6 shows a typical radio telephone. The portable radio telephone shown in FIG. 6 is a cellular telephone 1 powered by a rechargeable battery pack. The telephone 1 includes a transceiver 8 comprising a receiver and transmitter and all the other features 9 conventionally found in a cellular telephone. Also, since these aspects of the telephone are not directly relevant to the instant invention no further details will be given here, except to say that a single microprocessor 4 is employed to control all the basic functions of the telephone 1 and to control the keypad and display functions.

Optionally, however, the telephone functions may be controlled by a master microcomputer, while the keypad and display functions are under the control of a separate slave microcomputer coupled to communicate with the master microcomputer.

The user-interface of telephone 1 comprises a display, e.g. a liquid crystal display 5, itself well-known in the art and a keypad 6 on the front of the telephone 1. The display is coupled to and regulated by the microprocessor 4 in the usual manner. The keypad 6 essentially comprises two main sets of keys, namely alpha numeric keys 6a associated with alpha numeric data especially for dialling telephone numbers, but also (optionally) for entering alphanumeric data into the telephone memories, e.g. a subscriber number index, and a set of function keys 6b for enabling various predetermined functions or operations.

The keys 6a are arranged in four rows of three keys each. As is conventional for the numeric key layout of a telephone, the top row comprises keys for numbers 1, 2 and 3 respectively, the second row down for numbers 4, 5 and 6 respectively, the next row down for numbers 7, 8 and 9 respectively, and the bottom row for *, 0 and # respectively. Some or all of these keys may also be associated with alphabet information, as again is quite conventional. The alphabetic rather than numeric data is selected for example by preceding the alphanumeric keystroke with another predetermined keystroke or set of keystrokes, specifically using the function keys. Hence the alphabetic data mode may be enabled for example by preceding the particular keystroke with previously depressing a "MEMORY" or "STORE" key disposed among the function keys 6b.

As is usual in cellular telephones, the keys 6b include a "SEND" and "END" key for respectively initiating and terminating a telephone call. Another key, specifically located in the top left-hand corner is an "ON/OFF" key for turning the telephone on and off, i.e. by connecting and disconnecting the battery pack power supply. Another of the function keys may be a menu or function key labelled, for example, "MENU" or "FUNCTION" or with a suitable abbreviation thereof. Depression of this key enables a variety of pre-set menus, the related instructions of which are stored in memory, to be viewed and selectively enabled. The various menus are selected by depressing the appropriate alphanumeric keys after depressing the "MENU" or "FUNCTION" key. The relevant menu is shown to the user in words or abbreviations on the display panel 5.

SUMMARY OF THE INVENTION

According to a first aspect of the present invention, there is provided a receiver for a radio telephone, comprising receiving means for receiving a signal comprising multi-stage encoded information, means for recognising information from the multi-stage encoded information or first stage decoded information, and control means for enabling a quiescent mode for the receiver in accordance with a recognition result.

According to a second aspect of the present invention, there is provided a method of receiving multi-stage encoded information signals for a radio telephone receiver, comprising recognising information from the multi-stage encoded information or first stage decoded information, and enabling a quiescent mode for the receiver in accordance with a recognition result.

This has the advantage that the receiver need only be turned on if there is the likelihood that the incoming signal requires a response or acknowledgement from the mobile terminal. Thus, the receiver is only kept on when required. This results in a substantial saving in power consumption.

In a preferred embodiment the means for recognising information comprises means for deriving information from the multi-stage encoded information or a first stage decoded information, and comparing means for comparing derived information with predetermined information, the quiescent mode being enabled in accordance with a comparison result.

Preferably, the predetermined information is a bit pattern, and the deriving means derives information bit by bit. This has the advantage that information can be derived quickly on a bit by bit or collection of bits basis, for example block by block.

Additionally, the comparing means compares the derived information bit by bit with the predetermined bit pattern. Thus, the receiver can be put into a quiescent or low power mode quickly if the information is not of interest.

The first stage decoded information is derivable after de-scrambling the received signal. Optionally, the predetermined information is adaptable in accordance with a scrambling process, and the information is derivable from the received multi-stage encoded information signal.

Suitably, the received signal is a paging control channel message. Thus, in standby mode a receiver is only turned on when expecting a message, and only for a duration during which it detects a likelihood of there being a paging message for it. The Applicant believes that the utilisation of the present invention in standby mode for the reception of paging channel messages may result in up to 30% increase in standby time for a given power source (e.g. battery type).

The paging control channel message is indicative of a paging message being present in the received signal. Alternatively, the paging control channel message is indicative of no paging messages being present in the received signal.

The received signal may be an actual page, and in standby mode a receiver is only turned on when the paging message includes a page for that receiver.

BRIEF DESCRIPTION OF THE DRAWINGS

FIG. 4 shows a paging message bit pattern for the RCR 27 system;

FIG. 5 is a flow chart in accordance with an embodiment of the invention, and

FIG. 6 is a schematic diagram of a radio telephone.

DESCRIPTION OF AN EMBODIMENT IN ACCORDANCE WITH THE INVENTION

Embodiments of the invention will now be described, by way of example only, and with reference to the accompanying drawings.

A typical radio telephone system such as the Japanese RCR-27 personal digital cellular system, is a Time Division Multiple Access (TDMA) system. In such a system there are allotted a sequence of time slots, each defining a data frame or burst of 6.6 ms duration. The sequence format is continuously repeated, and a radio telephone is typically assigned to at least one of the time slots in the format during which slot it receives or transmits information, whilst ignoring signals in the other time slots.

Figure 1A:
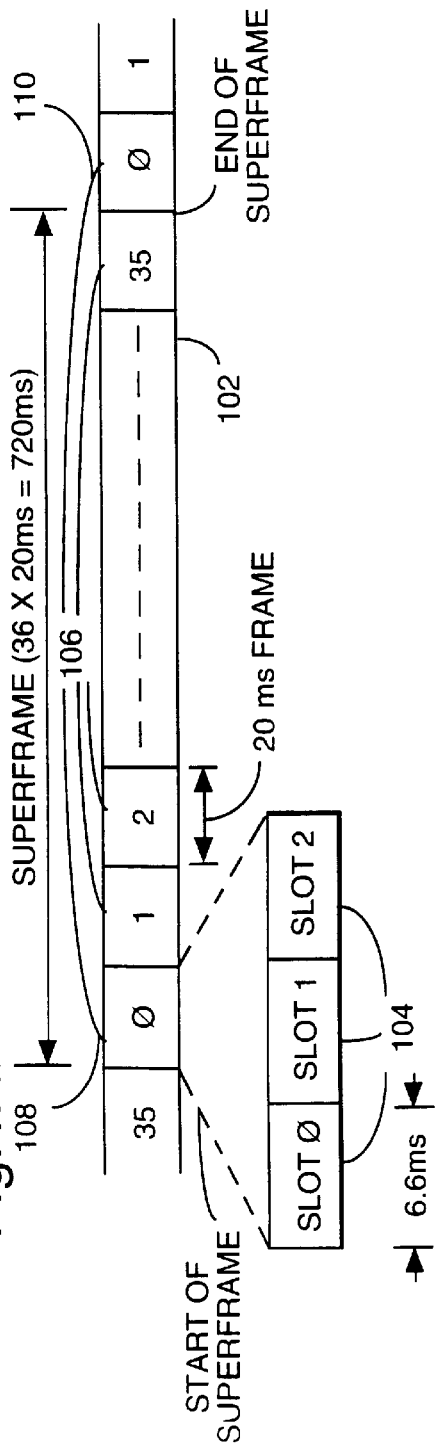
FIG. 1A shows a schematic diagram of a superframe structure for the RCR-27 system.

FIG. 1A shows the superframe structure 102 for a RCR radio telephone system. Each superframe 102 comprises 36 (0 . . . 35) frames 106 of 20 ms duration and each frame 106 comprises three time slots 104 each of 6.6 ms duration. From start 108 to finish 110 of a superframe 102 is 720 ms.

Figure 1B:
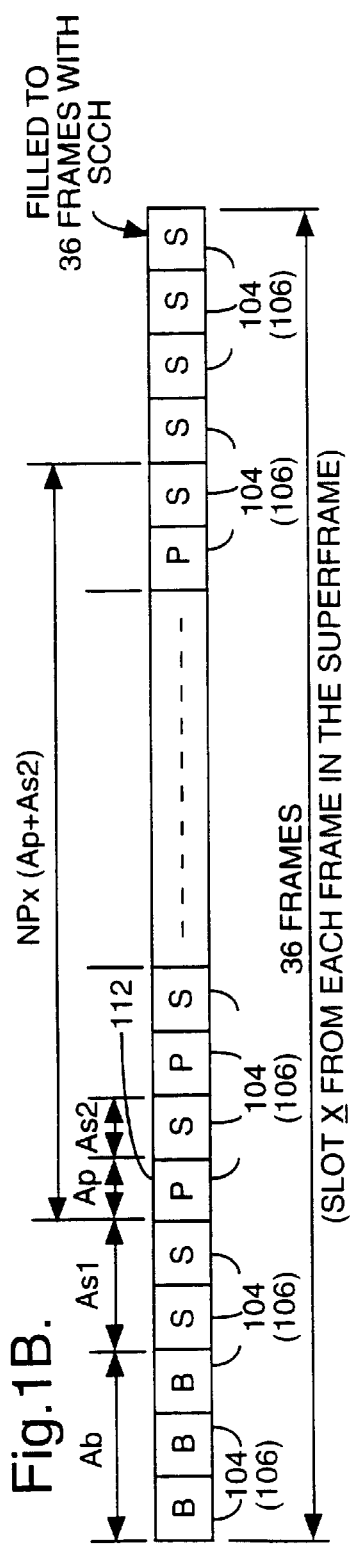
FIG. 1B shows a schematic diagram for a control channel structure.

The control channel structure is shown in FIG. 1B. In this figure only 1 slot 104 (e.g. slot 0) from each frame 106 of a superframe 102 is shown.

The slots labelled B are reserved for transmitting broadcast messages from a base station to radio telephones. The slots labelled P are paging channels (PCH), and those labelled S are Signalling Control Channels. The number of each type of slot and their position in the control channel are determined by the base station parameters $A_b$, $A_{s1}$, $A_p$, $A_{s2}$ and $N_p$ which may vary from base station to base station, and network to network.

When a radio telephone registers with a system or a new base station, it is assigned one or more slots 104 for receiving paging information. This is known as the paging control channel (PCH), and in FIG. 1B is shown as slot 112 labelled P. Only one such PCH channel is assigned for each radio telephone. During standby mode the radio telephone is in its quiescent or sleep state, and only housekeeping functions, such as timers, are operable for the radio telephone. The timing during the sleep state operates to activate the radio telephone during each superframe 102 to enter a receive state co-incident with the PCH 112. Typically, the receive state can account for between 50% to 80% of the power consumed during the standby mode.

Figures 2, 3:
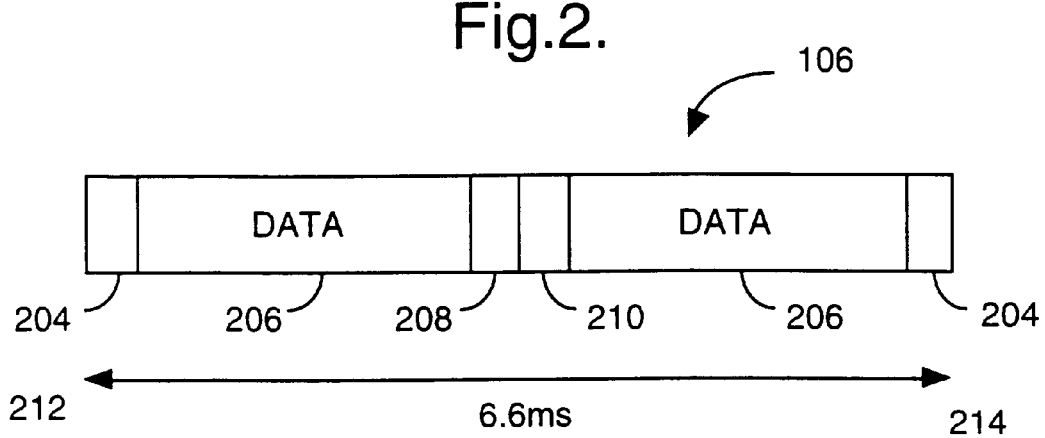
FIG. 2 shows a schematic diagram for the slot structure for the RCR 27 system.
FIG. 3 shows a standard paging message for the RCR-27 system.

The structure of slot or burst 104 is shown in FIG. 2. The slot is 6.6 ms in length and at each end 212, 214 there are ramp bits 204. Data is split into two blocks 206, separated by a synchronisation (sync.) word 208 and a colour code 210. The sync. word 208 is a fixed sequence of bits different for respective slots and is used to adjust the timing of the radio telephone to the incoming frame or burst 106. The colour code 210 is different for each channel and is again a fixed pattern of bits. The colour code 210 acts to inhibit co-channel interference. When a radio telephone first registers with a base station or system, it looks for a control message and uses the sync. word to sychronise itself with the system and records the colour code as indicative of the channel assigned for the radio telephone.

For a paging control channel (PCH) 104, the data in blocks 206 contain information on whether a paging message is present in the PCH, and to which radio telephone the paging message is sent. Respective radio telephones are identified by their Mobile Station Identity (MSI), which is typically transmitted to the network when the radio telephone registers with the network and is assigned a PCH. The data in blocks 206 transmitted over the physical channel has first been encoded, interleaved and then scrambled in a well known manner by the network before being transmitted to the radio telephone. Thus, in order to obtain the paging information the data has to be de-scrambled, de-interleaved and decoded by the mobile station. Since, interleaving and consequently de-interleaving are performed on a burst by burst basis, the whole 6.6 ms burst has to be received before the data can be retrieved. More often than not the retrieved data indicates that there is no paging message on the paging channel, and even if there is, it is not for the radio telephone currently described.

FIG. 3 shows a standard paging message for a radio telephone system such as the RCR-27 system. The paging message shown in FIG. 3 is before (or after) any decoding, de-interleaving, de-scrambling, coding, interleaving or scrambling has been performed on it. The bits labelled "1" or "0" are fixed for a paging message being present on the paging channel and the bits labelled "X" are "don't care" and can vary for each message sent. The sequence of bits "1", "0" are fixed for indicating that a paging message is present on the paging control channel, and thus there is always this unique sequence of bits to indicate the presence of a paging message on the PCH.

In a first embodiment of the present invention use is made of an observed relationship between the sequence of bits prior to coding, interleaving and scrambling a paging message and the sequence of bits after de-scrambling the paging message, when a paging message is present on the PCH. The sequence of bits after de-scrambling is shown in FIG. 4. Those bits labelled "1", "0" are fixed and indicate the presence of a paging message. The bits labelled "X" are "don't care" for the purposes of the present invention and can vary from message to message. Since de-scrambling is performed on a bit by bit basis, not a burst by burst basis, each bit "1", "0" of interest of a received PCH message can be inspected on a bit by bit basis, and as soon as the de-scrambled message departs from the fixed sequence of bits the receiver can be switched into a quiescent mode or low power mode, or even switched off since the message does not contain a paging message. Thus, the receiver is switched on only for a time period in which there is a possibility of a paging message being present on the PCH.

There is a drawback to the foregoing method. If the data is corrupted the receiver may interpret the corrupted data as indicating that the message is not a paging message, even when such a message may be present.

To overcome this problem, a different sequence of bits has been derived by the Applicant which will always be present in the de-scrambled message if no paging message has been transmitted on the PCH.

When no paging message is transmitted on the PCH, the data before coding, interleaving and scrambling is zero. The Applicant has utilised the relationship between the de-scrambled sequence of bits and the sequence of bits for the paging message which would always be transmitted for no paging message. Thus, again the Applicant is able to inspect the de-scrambled message on a bit by bit basis to see if a paging message has been sent.

There is the option of using the first and second described methods individually, or to use a combination of the methods to reduce the chance of error.

Typically, a radio telephone comprises control circuitry such as dedicated logic, digital signal processors and microcontrollers 4. A receiver of a radio telephone may be under the control of such circuitry, and FIG. 5 shows a flow chart for circuitry configured or conditioned in accordance with an embodiment of the invention. At step 502 the radio telephone enters standby mode, and sleeps at step 504. During the sleep the quiescent operations of the radio telephone monitor the time for the next PCH, step 506. If it is determined at step 506 that it is time for a PCH then the operation of the circuitry proceeds to step 508 where the receiver is activated. At step 510 the first bit of the incoming message is de-scrambled. The de-scrambled first bit is checked against the first bit of the known bit pattern in FIG. 4 which is typically stored in a memory at step 512, and if it is correct the operation branches at step 514 to step 516 where the next bit is de-scrambled. If the decision at step 514 is NO then the operation returns to step 504. At step 516 the next bit is descrambled and checked at step 518 against the next bit is the known bit pattern shown in FIG. 4. If the bit is incorrect then the process branches at step 520 to step 504. If the decision at step 520 is YES then it is checked at step 522 as to whether it is the last bit in the known sequence or not. If the decision at step 522 is NO then the process returns to step 516, otherwise a NO decision causes the process to proceed to step 524 where the paging message is decoded.

Although the foregoing description refers to a comparison on a bit by bit basis, a group of bits or even a block at a time could be compared.

Note that FIG. 5 shows that the first bit is checked against the known pattern 512 and that each sequential bit is also checked against a known pattern 518 in a cumulative and sequential fashion as indicated by the decision diamonds 520, 522 in conjunction with process block 516. Lastly, note that the bits are checked before the message is decoded 524.

The principle of the method shown in FIG. 5 can be used for either comparing a de-scrambled incoming message with the bit pattern which indicates a paging message is present, or the bit pattern indicating no paging messages are present or with appropriate minor modification comparing the de-scrambled incoming message with both types of bit pattern.

In view of the foregoing description it will be evident to a person skilled in the art that various modifications may be made within the scope of the invention. The descrambling may be performed taking two or more bits at a time, such as a block at a time.

For example, the comparison with the known bit pattern can be carried out before de-scrambling and the known bit pattern be configured to have the bit pattern for scrambled messages. This can be done by utilising the known or assigned colour code and scrambling, for example Exclusive Oring, the known bit pattern of FIG. 4 with the colour code to obtain a scrambled bit pattern to compare with the received scrambled signal. Embodiments of the invention are not limited to receiving paging messages, but may be used for receiving any type of message for which the de-scrambled bit pattern can be derived in advance and stored in memory, such as an actual page for a particular receiver. Such page being that receiver's unique identity. Nor should the invention be limited to radio telephone messages, but can be applied to other communication systems.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or of any such further application derived therefrom.

What we claim is:

1. A receiver of a radio telephone, comprising:
   receiving means for receiving a signal comprising multi-stage encoded information:
   means for comparing the multi-stage encoded information or first stage decoded information with predetermined information before said encoded information is fully decoded, and
   control means for enabling a quiescent mode for the receiver in accordance with the result of the comparison.

2. A receiver according to claim 1, wherein the means for comparing the multi-stage encoded information comprises:
   means for deriving information from the multi-stage encoded information or a first stage decoded information before said encoded information is fully decoded, and
   means for comparing the derived information with the predetermined information, the quiescent mode being enabled in accordance with the comparison result.

3. A receiver according to claim 2, wherein the predetermined information is a bit pattern.

4. A receiver according to claim 3, wherein the deriving means derives information bit by bit.

5. A receiver according to claim 4, wherein the derived information comparing means compares the derived information bit by cumulative sequential bit with the predetermined bit pattern.

6. A receiver according to claim 1, wherein the first stage decoded information is obtained by de-scrambling the received signal.

7. A receiver according to claim 2, wherein the predetermined information is derived in accordance with a scrambling process, and the information is derivable from the received multi-stage encoded information signal.

8. A receiver according to claim 1, wherein the received signal is a paging control channel message.

9. A receiver according to claim 8, wherein the paging control channel message is indicative of a paging message being present in the received signal.

10. A receiver according to claim 8, wherein the paging control channel message is indicative of no paging messages being present in the received signal.

11. A method for receiving multi-stage encoded information signals for a radio telephone receiver, comprising the steps of:
   upon receiving a multistage encoded information signal, comparing information from the multi-stage encoded information or first stage decoded information with predetermined information before said encoded information is fully decoded; and
   enabling a quiescent mode for the receiver in accordance with a comparison result.

12. A method according to claim 11, wherein the step of comparing information comprises:
   deriving information from the multi-stage encoded information or first stage decoded information before said encoded information is fully decoded, and
   comparing the derived information with the predetermined information.

13. A method according to claim 12, wherein the predetermined information is a bit pattern.

14. A method according to claim 13, wherein information is derived bit by bit.

15. A method according to claim 14, wherein the derived information is compared bit by cumulative sequential bit with the predetermined bit pattern.

16. A method according to claim 11, wherein the fist stage decoded information is obtained by de-scrambling the received signal.

17. A method according to claim 12, wherein the predetermined information is derived in accordance with a scrambling process, and the information is derivable from the received multi-stage encoded information signal.

18. A method according to claim 11, wherein the received signal is a paging control channel message.

19. A method according to claim 18, wherein the paging control channel message is indicative of a paging messages being present in the received signal.

20. A method according to claim 18, wherein the paging control channel message is indicative of a paging message being present in the received signal.

* * * * *